United States Patent
DiSanza et al.

(10) Patent No.: US 6,857,034 B1
(45) Date of Patent: Feb. 15, 2005

(54) COMPUTER PERIPHERAL DEVICE INCORPORATING INFRARED TRANSMISSIONS

(75) Inventors: Leonard J DiSanza, Austin, TX (US); Libor Nouzovsky, Austin, TX (US)

(73) Assignee: Sigmatel, Inc., Austin, TX (US)

(*) Notice: Subject to any disclaimer, the term of this patent is extended or adjusted under 35 U.S.C. 154(b) by 0 days.

(21) Appl. No.: 09/549,651

(22) Filed: Apr. 14, 2000

(51) Int. Cl.[7] ................ G06F 13/42; G06F 13/00
(52) U.S. Cl. ........................... 710/106; 710/316
(58) Field of Search .................. 710/63, 62, 64, 710/100, 106, 51, 305, 306, 316

(56) References Cited

U.S. PATENT DOCUMENTS

| | | | | |
|---|---|---|---|---|
| 5,237,663 A | * | 8/1993 | Srinivasan ................ | 710/305 |
| 5,424,524 A | * | 6/1995 | Ruppert et al. ............ | 705/8 |
| 5,781,028 A | * | 7/1998 | Decuir ...................... | 326/30 |
| 5,890,015 A | * | 3/1999 | Garney et al. ............. | 710/62 |
| 6,085,265 A | * | 7/2000 | Kou .......................... | 710/63 |
| 6,289,466 B1 | * | 9/2001 | Bayramoglu et al. ..... | 713/310 |
| 6,334,160 B1 | * | 12/2001 | Emmert et al. ............ | 710/11 |
| 6,356,968 B1 | * | 3/2002 | Kishon ...................... | 710/306 |
| 6,424,525 B1 | * | 7/2002 | MacLeod et al. .......... | 361/686 |

* cited by examiner

Primary Examiner—Tim Vo
(74) Attorney, Agent, or Firm—Garlick, Harrison & Markison, LLP; Timothy W. Markison

(57) ABSTRACT

A computer peripheral device includes circuitry that performs a computer peripheral function, a USB cable, and a USB\IR transceiver. The circuitry may be implemented to perform a mouse function, a keyboard function, a portable printer function, a microphone function, a hand scanner function, and/or a video camera function. The USB cable is operably coupled to provide connectivity with a computer to the circuitry and/or the USB/IR transceiver.

8 Claims, 2 Drawing Sheets

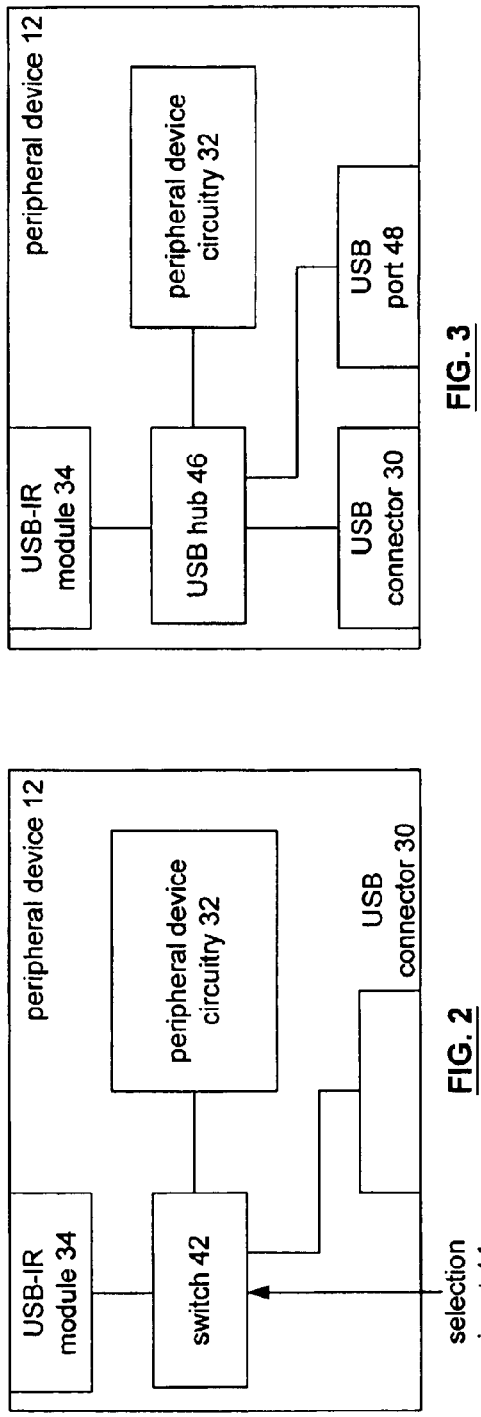
FIG. 2
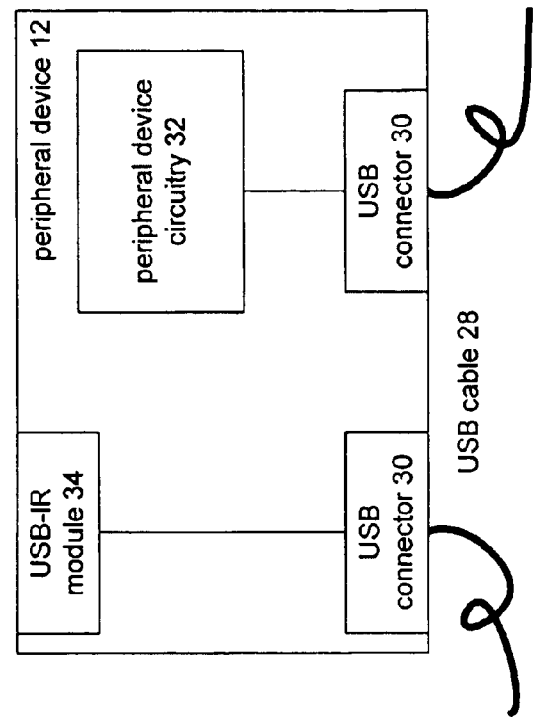
FIG. 3
FIG. 4

COMPUTER PERIPHERAL DEVICE INCORPORATING INFRARED TRANSMISSIONS

TECHNICAL FIELD OF THE INVENTION

This invention relates generally to data transmissions and more particularly to data transmissions via a computer peripheral device.

BACKGROUND OF THE INVENTION

Computers are known to include a central processing unit, system memory, video graphics processing circuitry, audio processing circuitry, and peripheral ports. The peripheral ports allow the central processing unit to communicate with computer peripheral devices such as a computer mouse, keyboard, printer, monitor, scanner, etc. Such peripheral ports include serial ports, parallel ports and more recently the Universal Serial Bus (USB) port.

The USB port provides a data transmission path that can carry up to 12 megabits per second of data. By utilizing a USB hub, multiple devices may be coupled to a single USB port of a computer. As such, a computer mouse, keyboard, etc., may be coupled to a USB hub and then coupled through a single cable to the USB port of the computer. Alternatively, the USB port may be coupled to a USB/infrared dongle that provides infrared transmissions with peripheral devices. Such a USB/IR dongle is disclosed in co-pending patent applications entitled "Method and Apparatus for Providing USB to IR Data Transmissions, having a filing date of Feb. 8, 1999 and a Ser. No. 09/246,613, "Method and Apparatus for Transporting Data Utilizing Multiple Data Transports" having a filing date of Feb. 8, 1999 and a Ser. No. of 09/246,655, and a patent application entitled "Method and Apparatus for Recovering Data That Was Transported Utilizing Multiple Data Transport Protocols" having a filing date of Feb. 8, 1999 and a Ser. No. of 09/246,653.

With the ever increasing trend of reducing the computer's desk space requirements, integration of peripheral devices is a benefit. Therefore, a need exists for a computer peripheral device that further includes infrared transmission capabilities.

BRIEF DESCRIPTION OF THE DRAWING

FIG. 2 illustrates an alternate embodiment of a peripheral device in accordance with the present invention;

FIG. 3 illustrates a schematic block diagram of another peripheral device in accordance with the present invention; and FIG. 4 illustrates a schematic block diagram of yet another peripheral device in accordance with the present invention.

DETAILED DESCRIPTION OF A PREFERRED EMBODIMENT

Figure 1:
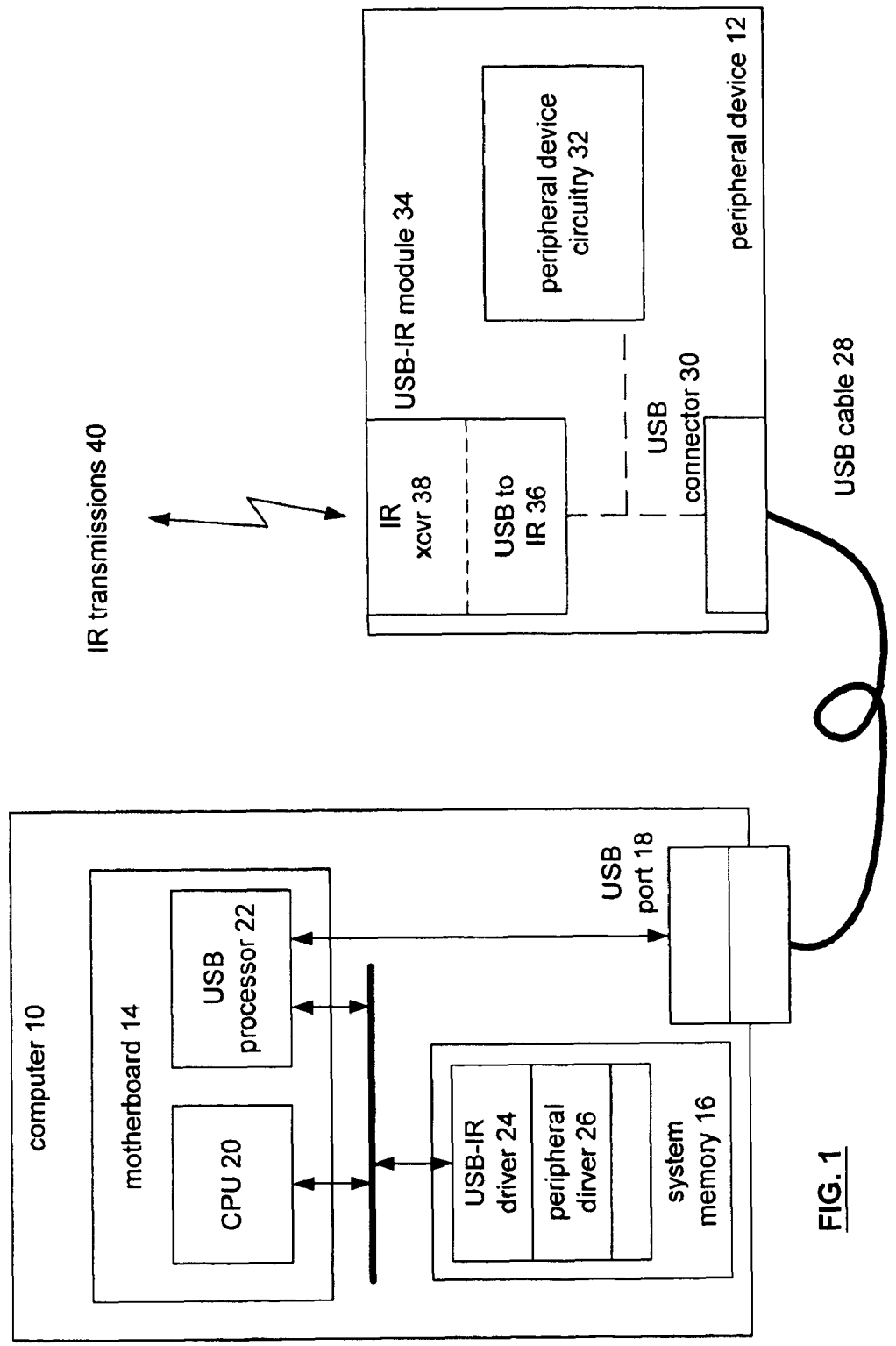
FIG. 1 illustrates a computer operably coupled to a device that is in accordance with the present invention.

Generally, the present invention provides a computer peripheral device that includes circuitry which performs a computer peripheral function, a USB cable, and a USB\IR transceiver. The circuitry may be implemented to perform a mouse function, a keyboard function, a portable printer function, a microphone function, a hand scanner function, and/or a video camera function. The USB cable is operably coupled to provide connectivity with a computer to the circuitry and/or the USB/IR transceiver. As such, a USB/IR transceiver module may be integrated into an existing computer peripheral device thereby adding the functionality of the USB/IR transmissions without the addition of a separate USB/IR dongle.

The present invention can be more fully described with reference to FIGS. 1 through 4. FIG. 1 illustrates a schematic block diagram of a computer 10 operably coupled to a peripheral device 12 via a USB cable 28. The computer 10 includes a motherboard 14, system memory 16 and at least one USB port 18. The motherboard 14 includes a central processing unit 20 and a USB processor 22. Computer 10 may be a standard personal computer, laptop, work station, or any other commercially available computer equipped with a USB/IR driver 24 and the peripheral driver software 26. The drivers 24 and 26 are shown in system memory 16 but may be stored anywhere within the computer. Functionality of the USB/IR software driver 24 is described in greater detail with reference to the above-mentioned co-pending patent applications.

The peripheral device 12 includes a USB/IR module 34, peripheral device circuitry 32, and a USB connector 30. The USB/IR module 34 includes an IR transceiver section 38 and a USB to IR conversion section 36. The USB/IR module 34 is discussed in greater detail in the above-mentioned co-pending applications. The peripheral device 12 is operably coupled to allow the USB/IR module 34 and/or the peripheral device circuitry 32 to be coupled via the USB connector 30 to the computer 10. Note that the peripheral device circuitry 32 may be implemented to function as a mouse, keyboard, portable printer, microphone, hand scanner, video camera, etc. Such functionality is known, thus no further discussion will be presented except to further illustrate the teachings of the present invention.

As one of average skill in the art would appreciate, the peripheral device 12 may be coupled to the computer 10 via a cable other than an USB cable. For example, the peripheral device 12 may be coupled via the mouse port, keyboard port, printer port, serial port, etc. of the computer. Regardless of the cable coupling the peripheral device 12 to the computer 10, the peripheral device includes the USB/IR module 34 and the peripheral circuitry 32. Either of these devices 32 or 34 may be coupled to the computer via the cable.

FIG. 2 illustrates a schematic block diagram of an alternate embodiment of the peripheral device 12. In this embodiment, the peripheral device 12 includes a switch 42 that, based on a selection input 44, selects either the USB/IR module 34 or the peripheral device circuitry 32 to be coupled to the USB connector. The switching circuitry may be a simple mechanical switch mounted on the housing, for example, of a mouse, that, when depressed, causes the USB/IR module 34 to be coupled to the USB connector 30. When in another position, the switch 42 causes the peripheral device 32 to be coupled to the USB connector 30.

FIG. 3 illustrates another embodiment of the peripheral device 12. In this embodiment, the peripheral device 12 includes a USB hub 46 and at least one USB port 48. In this embodiment, the peripheral device 12, such as a mouse, functions as a USB hub. The USB hub 46 allows either the USB/IR module 34, the peripheral device circuitry 32, and/or the USB port 48 to be coupled to the USB connector 30.

FIG. 4 illustrates yet another embodiment of the peripheral device 12. In this embodiment, two USB cables are connected to two USB connectors. One of the USB connectors is directly coupled to the USB/IR module 34 while the other is directly connected to the peripheral device circuitry 32. In this embodiment, both the USB/IR module 34 and the peripheral device 32 may be simultaneously active.

The preceding discussion has presented a computer peripheral device that includes IR transceiving capabilities. By utilizing the existing housing of peripheral devices to incorporate a USB/IR transceiver module, a computer may be extended the functionality of USB/IR transmissions without additional hardware coupled thereto. As one of average skill in the art will appreciate, other embodiments may be derived from the teachings of the present invention without deviating from the scope of the claims or the spirit of the invention.

What is claimed is:

1. A computer peripheral device comprising:

circuitry to perform a computer peripheral function;

Universal Serial Bus (USB) cable that provides a connection to a computer;

USB/IR (infrared) transceiver operably coupled to the USB cable and to provide infrared transmissions with peripheral devices, wherein at least one of the circuitry and the USB/IR transceiver is actively coupled to the computer via the USB cable; and switching circuitry that is operable to switch between the circuitry and the USB/IR transceiver based on a selection input, wherein the switching circuitry actively couples either the circuitry or the USB/IR transceiver to the computer.

2. The computer peripheral device of claim 1, wherein the circuitry further comprises being implemented to perform at least one of: a mouse function, a keyboard function, a portable printer function, a microphone function, hand scanner function, and a video camera function.

3. The computer peripheral device of claim 1 further comprises a USB hub operably coupled to the circuitry, the USB cable, and the USB/IR transceiver, wherein the USB hub enables both the circuitry and the USB/IR transceiver to be actively coupled to the computer.

4. The computer peripheral device of claim 1, wherein the USB cable further comprises a pair of USB cables, wherein one of the pair of USB cables is coupled to the circuitry and another of the pair of USB cables is coupled to the USB/IR transceiver.

5. The computer peripheral device of claim 3 further comprises at least one USB port operably coupled to the USB hub.

6. A computer peripheral device comprising:

circuitry to perform a computer peripheral function;

a cable that provides a connection to a computer; and infrared transceiver operably coupled to the cable and to provide infrared transmissions with peripheral devices, wherein at least one of the circuitry and the infrared transceiver is actively coupled to the computer via the cable; and switching circuitry that is operable to switch between the circuitry and the infrared transceiver based on a selection input, wherein the switching circuitry actively couples either the circuitry or the infrared transceiver to the computer.

7. The computer peripheral device of claim 6, wherein the circuitry further comprises being implemented to perform at least one of: a mouse function, a keyboard function, a portable printer function, a microphone function, hand scanner function, and a video camera function.

8. The computer peripheral device of claim 6, wherein the cable further comprises a pair of cables, wherein one of the pair of cables is coupled to the circuitry and another of the pair of cables is coupled to the infrared transceiver.

* * * * *